United States Patent
Murakami (10) Patent No.: US 10,642,381 B2
(45) Date of Patent: May 5, 2020

(54) VEHICULAR CONTROL UNIT AND CONTROL METHOD THEREOF

(71) Applicant: KYOCERA Corporation, Kyoto (JP)

(72) Inventor: Kazuhiro Murakami, Machida (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/078,961

(22) PCT Filed: Feb. 7, 2017

(86) PCT No.: PCT/JP2017/004439
§ 371 (c)(1),
(2) Date: Aug. 22, 2018

(87) PCT Pub. No.: WO2017/145745
PCT Pub. Date: Aug. 31, 2017

(65) Prior Publication Data
US 2019/0050073 A1    Feb. 14, 2019

(30) Foreign Application Priority Data

Feb. 23, 2016 (JP) ................... 2016-032331

(51) Int. Cl.
*G06F 3/0354* (2013.01)
*B60R 16/02* (2006.01)
(Continued)

(52) U.S. Cl.
CPC .......... *G06F 3/03547* (2013.01); *B60K 35/00* (2013.01); *B60R 16/02* (2013.01);
(Continued)

(58) Field of Classification Search
CPC .. G06F 3/03547; G06F 3/0354; G06F 3/0416; G06F 3/04883; G06F 3/04886;
(Continued)

(56) References Cited

U.S. PATENT DOCUMENTS

| 9,015,584 B2* | 4/2015 | Park ...................... G06F 3/0488 |
| | | 715/702 |
| 2011/0148774 A1* | 6/2011 | Pihlaja ................ G06F 3/04883 |
| | | 345/173 |

(Continued)

FOREIGN PATENT DOCUMENTS

| JP | 2002-012091 A | 1/2002 |
| JP | 2012-027816 A | 2/2012 |

(Continued)

*Primary Examiner* — Nitin Patel
*Assistant Examiner* — Amy Onyekaba
(74) *Attorney, Agent, or Firm* — Studebaker & Brackett PC (57) ABSTRACT

A vehicular control unit includes a touch sensor on which a predetermined area is set, a tactile sensation presentation unit, a pressing detector, and a controller that enables operation of a vehicle mounted apparatus in response to an input to the touch sensor when pressing is equal to or higher than a first pressure. The controller is configured to: when the operation of the vehicle mounted apparatus is enabled, within a first time period, cause the tactile sensation presentation unit to present a tactile sensation corresponding to enablement of the operation of the vehicle mounted apparatus; in the case of a first slide in a direction going out of the predetermined area, cause the tactile sensation presentation unit to present a tactile sensation corresponding to the first slide; and in the case of a second slide in a direction going into the predetermined area, cause the tactile sensation presentation unit to present a tactile sensation corresponding to the second slide.

20 Claims, 9 Drawing Sheets

(51) Int. Cl.
*G06F 3/0488* (2013.01)
*H01H 9/16* (2006.01)
*G06F 3/01* (2006.01)
*H01H 36/00* (2006.01)
*G06F 3/041* (2006.01)
*B60K 35/00* (2006.01)
*B60R 16/03* (2006.01)

(52) U.S. Cl.
CPC .............. *B60R 16/03* (2013.01); *G06F 3/016* (2013.01); *G06F 3/0354* (2013.01); *G06F 3/041* (2013.01); *G06F 3/0416* (2013.01); *G06F 3/04883* (2013.01); *G06F 3/04886* (2013.01); *H01H 9/16* (2013.01); *H01H 36/00* (2013.01); *B60K 2370/1438* (2019.05); *G06F 2203/014* (2013.01); *G06F 2203/04105* (2013.01)

(58) Field of Classification Search
CPC ..... G06F 2203/014; G06F 2203/04105; G06F 3/016; G06F 3/041; B60K 35/00; B60K 2370/1438; B60R 16/03; B60R 16/02; H01H 9/16; H01H 36/00
See application file for complete search history.

(56) References Cited

U.S. PATENT DOCUMENTS

| | | | | |
|---|---|---|---|---|
| 2012/0133496 | A1* | 5/2012 | Aono | G06F 3/016 340/407.2 |
| 2012/0154328 | A1* | 6/2012 | Kono | G06F 3/016 345/174 |
| 2013/0076686 | A1* | 3/2013 | Kono | G06F 3/0416 345/173 |
| 2013/0314357 | A1* | 11/2013 | Sudou | G06F 3/0488 345/173 |
| 2014/0232677 | A1* | 8/2014 | Yamane | G06F 3/041 345/173 |
| 2014/0300571 | A1* | 10/2014 | Tomizu | G06F 3/0416 345/173 |
| 2014/0317498 | A1* | 10/2014 | Okumura | G06F 3/016 715/702 |
| 2015/0192997 | A1* | 7/2015 | Nakagawa | G06F 3/016 345/174 |
| 2015/0378598 | A1* | 12/2015 | Takeshi | G06F 3/04886 715/773 |
| 2016/0342215 | A1* | 11/2016 | Endo | G06F 3/016 |

FOREIGN PATENT DOCUMENTS

JP 5452404 B2 * 3/2014
WO 2015/121964 A1 8/2015

* cited by examiner

| Car navigation system | Air conditioner |
|---|---|
| Audio DVD | Telephone |

FIG. 11

VEHICULAR CONTROL UNIT AND CONTROL METHOD THEREOF

CROSS-REFERENCE TO RELATED APPLICATION

This application claims priority to and the benefit of Japanese Patent Application No. 2016-032331 filed Feb. 23, 2016, the entire contents of which are incorporated herein by reference.

TECHNICAL FIELD

The present disclosure relates to a vehicular control unit and a control method thereof.

BACKGROUND

A vehicle is provided with an operation unit for a driver to operate apparatuses mounted on the vehicle (hereinafter, also referred to as "vehicle mounted apparatuses"). The operation unit is provided on or near a center console. When the driver views the operation unit provided near the center console in order to operate a vehicle mounted apparatus, the driver's line of sight may deviate from a forward direction while driving.

SUMMARY

A vehicular control unit according to one embodiment of the present disclosure includes a touch sensor on which a predetermined area is set. The vehicular control unit also includes a tactile sensation presentation unit for presenting a tactile sensation to a user via the touch sensor. The vehicular control unit further includes a pressing detector for detecting pressing against the touch sensor. The vehicular control unit furthermore includes a controller that enables operation of a vehicle mounted apparatus in response to an input to the touch sensor when the pressing is equal to or higher than a first pressure. The controller is configured to, when the operation of the vehicle mounted apparatus is enabled, within a first time period, cause the tactile sensation presentation unit to present a tactile sensation corresponding to enablement of the operation of the vehicle mounted apparatus. The controller is configured to, in the case of a first slide in a direction going out of the predetermined area, cause the tactile sensation presentation unit to present a tactile sensation corresponding to the first slide. The controller is configured to, in the case of a second slide in a direction going into the predetermined area, cause the tactile sensation presentation unit to present a tactile sensation corresponding to the second slide.

A control method according to one embodiment of the present disclosure is a control method of a vehicular control unit. The vehicular control unit includes a touch sensor on which a predetermined area is set. The vehicular control unit also includes a tactile sensation presentation unit for presenting a tactile sensation to a user via the touch sensor. The vehicular control unit further includes a pressing detector for detecting pressing against the touch sensor. The vehicular control unit furthermore includes a controller that enables operation of a vehicle mounted apparatus in response to an input to the touch sensor. The control method is, when the pressing is equal to or higher than a first pressure, enabling the operation of the vehicle mounted apparatus in response to an input to the touch sensor. The control method is, when the operation of the vehicle mounted apparatus is enabled, within a first time period, causing the tactile sensation presentation unit to present a tactile sensation corresponding to enablement of the operation of the vehicle mounted apparatus. The control method is, in the case of a first slide in a direction going out of the predetermined area, causing the tactile sensation presentation unit to present a tactile sensation corresponding to the first slide. The control method is, in the case of a second slide in a direction going into the predetermined area, causing the tactile sensation presentation unit to present a tactile sensation corresponding to the second slide.

DETAILED DESCRIPTION (Embodiment 1) A vehicular control unit according to the present embodiment may be a vehicle mounted apparatus.

Figure 1:
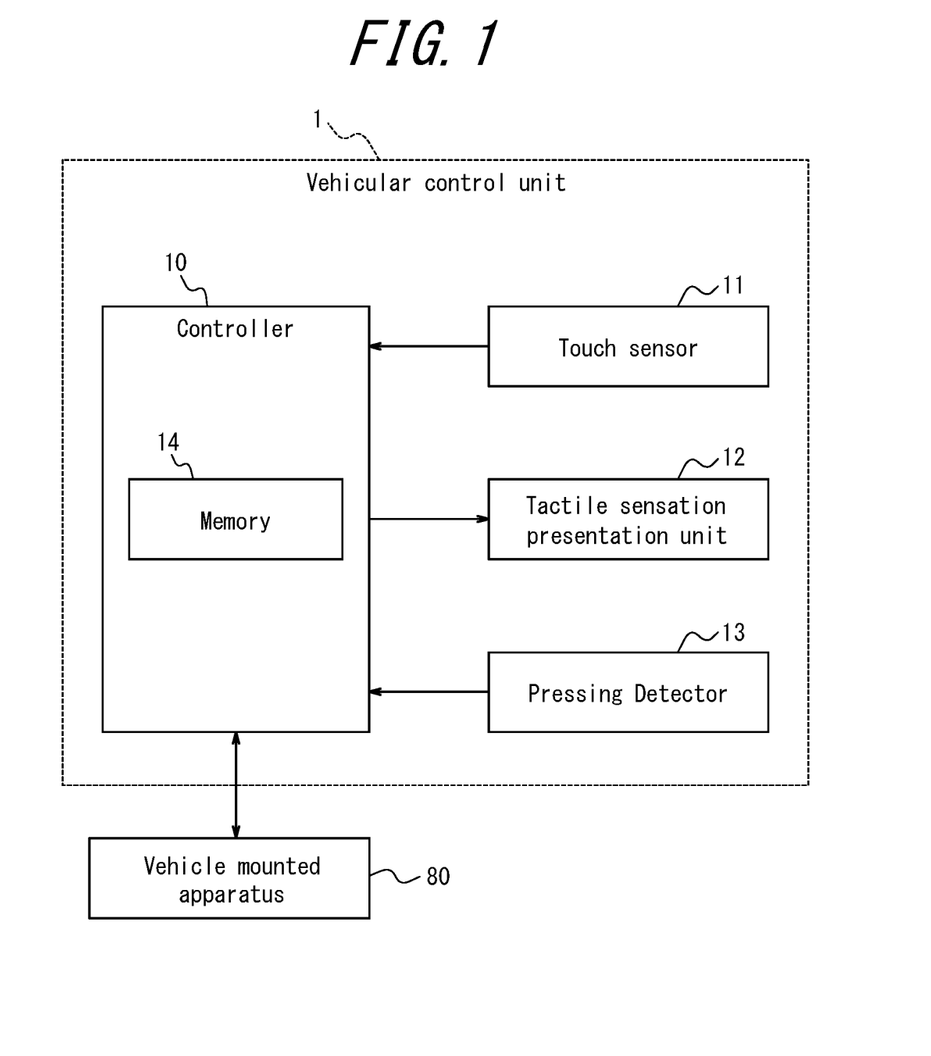
FIG. 1 is a functional block diagram illustrating the schematic configuration of a vehicular control unit according to Embodiment 1.

[Unit Configuration] As illustrated in FIG. 1, a vehicular control unit 1 includes a controller 10, a touch sensor 11, a tactile sensation presentation unit 12, and a pressing detector 13.

The controller 10 is respectively connected to the touch sensor 11, the tactile sensation presentation unit 12, and the pressing detector 13. The controller 10 is configured to output a signal or information associated with a signal to each of the connected units. Information associated with a signal is also referred to as control information. The controller 10 is configured to acquire control information from each of the connected units. In FIG. 1, each arrow connecting the controller 10 and the respective unit indicates the main direction in which control information is outputted. For example, the controller 10 and the touch sensor 11 are connected by an arrow directed from the touch sensor 11 to the controller 10. In this case, this indicates that control information is mainly outputted from the touch sensor 11 to the controller 10.

The controller 10 includes a memory 14. The memory 14 may be constituted by a semiconductor memory or the like. In the memory 14, various kinds of information, a program for operating the vehicular control unit 1, or the like may be stored. The memory 14 may also function as a working memory.

The controller 10 is configured to store control information in the memory 14 and acquire control information from the memory 14. The controller 10 is configured to control each of the connected units in accordance with the control information.

The controller 10 is connected to apparatuses mounted on the vehicle. The apparatuses mounted on the vehicle are also referred to as vehicle mounted apparatuses 80. The controller 10 is configured to output control information for operating the vehicle mounted apparatuses 80 in response to input to the touch sensor 11. Control information for operating the vehicle mounted apparatuses 80 is also referred to as apparatus operation information. The controller 10 is configured to acquire control information indicating the state of the vehicle mounted apparatuses 80.

The touch sensor 11 is for detecting touch by an object such as a finger or a stylus. In the following description, it is assumed that the touch sensor 11 is touched by a finger, however, it makes no difference when the touch sensor 11 is touched by an object such as a stylus. As the method by which the touch sensor 11 detects a touch, any method such as an electrostatic capacitance method, a resistive film method, a surface acoustic wave method or an ultrasonic method, an infrared method, an electromagnetic induction method, a load detection method, or the like can be used.

When the touch sensor 11 detects a finger touch, it acquires the coordinates of the touched position. The touch sensor 11 then outputs the coordinates of the touched position as control information to the controller 10. By touching the finger on the touch sensor 11, the user causes the controller 10 to execute a function corresponding to the touch position.

In the present embodiment, the shape of the touch sensor 11 is a rectangle with four corners. However, the shape of the touch sensor 11 is not limited to this. For example, the shape of the touch sensor 11 may be a circle, an ellipse, a polygon, or the like.

The tactile sensation presentation unit 12 is configured to present tactile sensation to the user's finger touching the touch sensor 11 by generating vibrations of various patterns according to a drive signal acquired from the controller 10. That is, the controller 10 outputs a drive signal as control information to the tactile sensation presentation unit 12, thereby starting driving the tactile sensation presentation unit 12.

The tactile sensation presentation unit 12 is constituted by a piezoelectric element, an ultrasonic vibrator, a vibration motor or an eccentric motor, or the like. For example, the tactile sensation presentation unit 12 generates a vibration based on a vibration pattern corresponding to a click feeling, a material texture, or the like, and presents a tactile sensation such as a click feeling, a material texture, or the like to the user's finger touching the touch sensor 11.

The pressing detector 13 is configured to detect pressure generated by, the user touching the touch sensor 11 with a finger, a stylus, or the like and further pressing the touch sensor 11. Pressure generated by pressing the touch sensor 11 is also referred to as pressing. The pressing detector 13 is configured to output data based on pressing as control information to the controller 10.

The pressing detector 13 may be constituted by a strain gauge sensor, a piezoelectric element or the like, whose physical or electrical characteristics such as strain, resistance, or voltage change according to pressing. For example, when the pressing detector 13 is constituted by a piezoelectric element, the voltage value of the piezoelectric element, which is an electrical characteristic, varies according to the magnitude of the load caused by pressing against the touch sensor 11. The voltage value which is an electrical characteristic is included in data based on pressing. The data based on pressing may not only include the voltage value, but also include the magnitude of the load caused by pressing, the resistance value, and the like.

The pressing detector 13 may be constituted in accordance with the detection method of the touch sensor 11. For example, when the detection method of the touch sensor 11 is a resistive film method, the magnitude of resistance according to the size of contact area can be associated with the load of pressing against the touch sensor 11. When the touch sensor 11 uses an electrostatic capacitance method, the capacitance size can be associated with the load of pressing against the touch sensor 11. With such a configuration, the pressing detector 13 can be constituted without using a strain gauge sensor, a piezoelectric element or the like.

The controller 10 may determine an input to an operation object at the touch position when the data based on pressing acquired from the pressing detector 13 is equal to or larger than a predetermined threshold value. Here, data based on pressing equal to or larger than a predetermined threshold value corresponds to pressing equal to or higher than a predetermined pressure. With such a configuration, erroneous input caused by the user accidentally touching the touch sensor 11 can be reduced.

The tactile sensation presentation unit 12 and the pressing detector 13 may be integrated. When both the tactile sensation presentation unit 12 and the pressing detector 13 are configured using a piezoelectric element, these can share a piezoelectric element. This is because a piezoelectric element generates a voltage when pressure is applied and deforms when a voltage is applied thereto.

Figure 2:
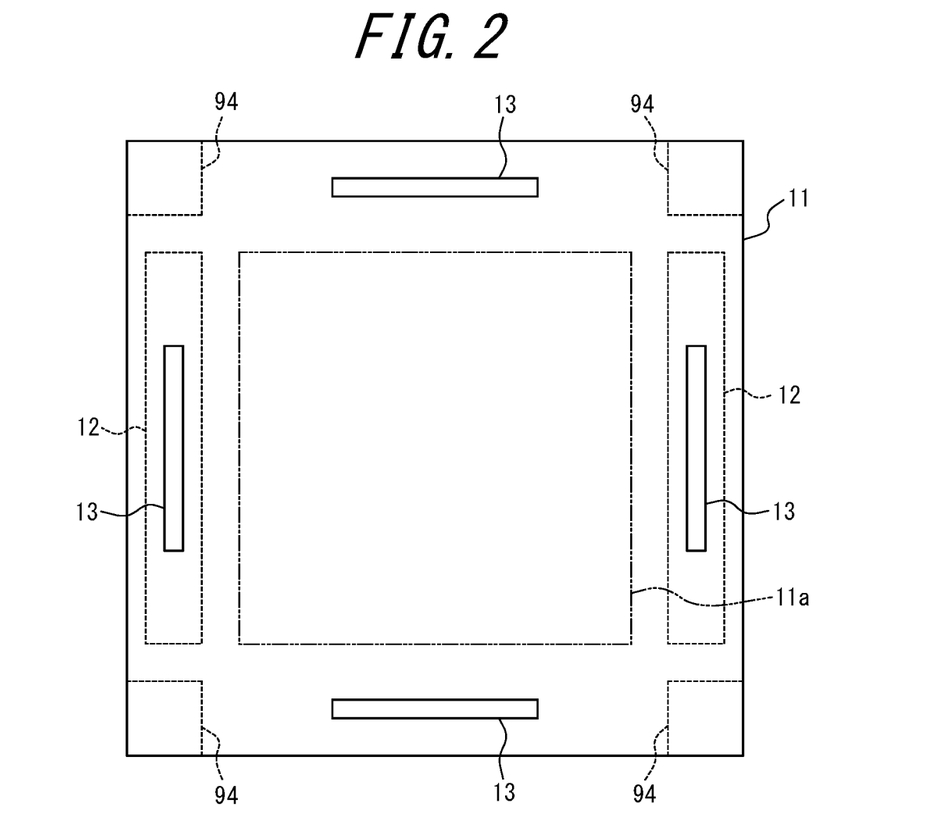
FIG. 2 is a plan view of a main part in a configuration example of the vehicular control unit.
Figure 3:
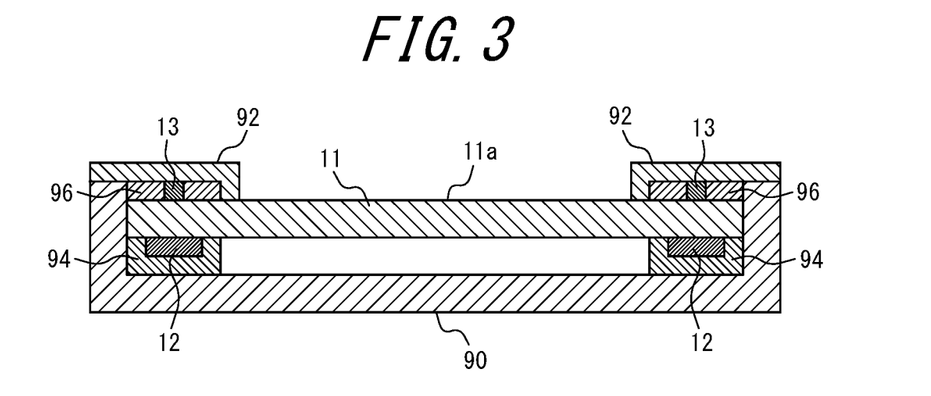
FIG. 3 is a cross-sectional view of the main part in the configuration example of the vehicular control unit.

The vehicular control unit 1 according to the present embodiment may be configured as illustrated in FIGS. 2 and 3. The touch sensor 11 is sandwiched between a housing 90 and an upper cover 92 via first insulators 94 and second insulators 96. The touch sensor 11 has a touch surface 11a that is not covered with the upper cover 92. In the vehicular control unit 1 according to the present embodiment, the shape of the touch surface 11a is assumed to be a rectangle. The touch surface 11a, however, may have other shapes depending on the specifications of the vehicular control unit 1. The first insulators 94 and the second insulators 96 are assumed to be disposed at four corners separated from the touch surface 11a. The housing 90, the upper cover 92 and the insulators 96 illustrated in FIG. 3 are omitted in FIG. 2.

The touch surface 11a positioned on the front surface side of the touch sensor 11 is made of, for example, a transparent film. The rear surface of the touch sensor 11 is made of, for example, glass. The touch sensor 11 may be configured such that when the touch surface 11a positioned on the front surface side is pressed, a minute amount of the transparent film on the front surface bends (deforms) in accordance with the pressing.

The upper cover 92 is convex with respect to the touch sensor 11. That is, the upper cover 92 projects beyond the touch surface 11a from the front surface side of the touch sensor 11. In this case, the user can easily know the edges or corners of the touch surface 11a by touch when touching the touch surface 11a.

The vehicular control unit 1 according to the present embodiment may include a strain gauge sensor for detection of pressing applied to the touch sensor 11 in the vicinity of each side covered with the upper cover 92 on the transparent film on the front surface of the touch sensor 11. The strain gauge sensors may be provided by adhesion or the like. In the vicinity of two opposite sides on the glass surface positioned on the rear surface side of the touch sensor 11, a piezoelectric element or an ultrasonic vibrator, a linear actuator, or the like for vibrating the touch sensor 11 may be provided by adhesion or the like. In the vehicular control unit 1 illustrated in FIGS. 2 and 3, the pressing detector 13 is constituted by four strain gage sensors. The tactile sensation presentation unit 12 is constituted by two vibrators. The pressing detector 13 may detect pressing based on, for example, the average value of outputs of the four strain gage sensors. The tactile sensation presentation unit 12 may, for example, drive the two vibrators in phase.

The configurations of the tactile sensation presentation unit 12 and the pressing detector 13 are not limited to those illustrated in FIGS. 2 and 3, and may be other configurations.

[Tactile Sensation Presentation Processing] The vehicular control unit 1 according to the present embodiment is capable of presenting a tactile sensation such as a click feeling when the touch sensor 11 is pressed or released, a material feeling such as a rough feeling or a smooth feeling when there is a slide on the touch sensor 11, an uneven feeling, or the like. For example, the vehicular control unit 1 can present a click feeling while presenting a material feeling. That is, the vehicular control unit 1 is capable of presenting various kinds of tactile sensations that are superimposed.

For example, the tactile sensation presentation unit 12 generates an ultrasonic vibration, thereby generating a squeeze air film between the touch surface 11a of the touch sensor 11 and the finger that is touching, thereby reducing the frictional force, and thereby a smooth feeling can be presented. For example, the tactile sensation presentation unit 12 changes the vibration in accordance with the slide of the finger, thereby changing the magnitude of the frictional force generated, and thereby a rough feeling can be presented. The method of presenting a tactile sensation is not limited to these.

The touch sensor 11 of the vehicular control unit 1 according to the present embodiment is assumed to be made of a uniform material such as glass or film, similarly to a general touch sensor 11. That is, it is assumed that the material of the touch sensor 11 does not differ locally. When the user touches without viewing the touch sensor 11, it is difficult to know which part of the touch sensor 11 is being touched based only on the tactile sensation due to the material of the touch sensor 11. That is, the user can not sense the touch position.

The vehicular control unit 1 according to the present embodiment can cause a user not viewing the touch sensor 11 to sense the touch position, by presenting a tactile sensation according to the touch position on the touch sensor 11, or presenting tactile sensation according to the slide of the finger that is touching. In order to perform processing corresponding to the touch position, the controller 10 sets predetermined areas on the touch sensor 11.

Figure 4:
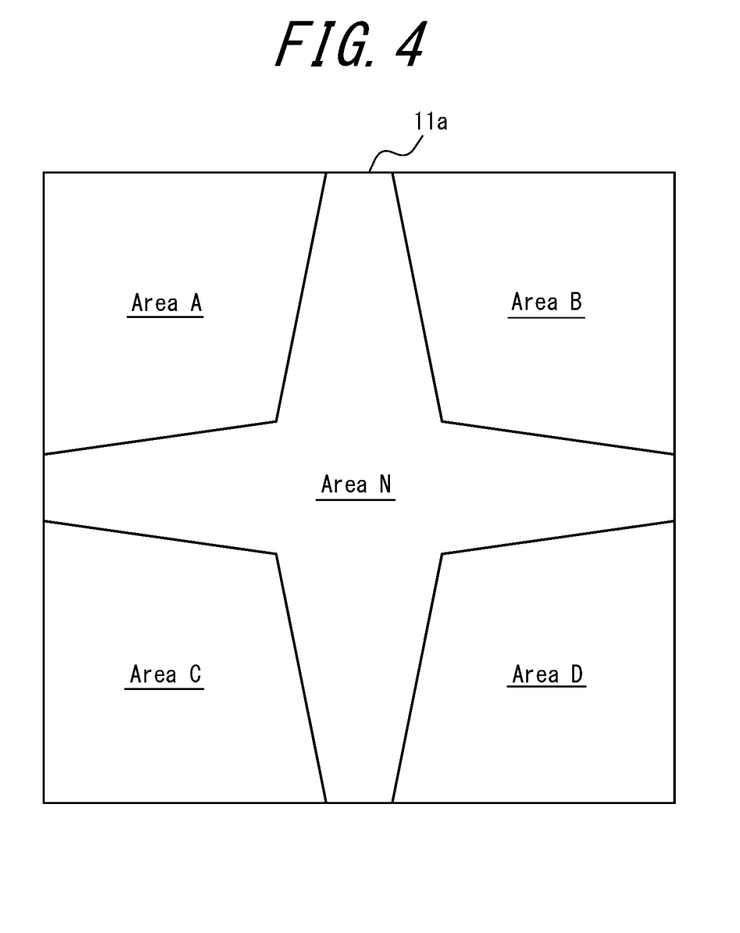
FIG. 4 is an example of area demarcation on a touch sensor of the vehicular control unit.

As illustrated in FIG. 4, the touch sensor 11 has an area A, an area B, an area C and an area D set to respectively include one of the four corners of the touch sensor 11. The areas A, B, C and D are associated with functions to be operated by the vehicular control unit 1. For example, the area A may be associated with an operation function of car navigation system. The area B may be associated with an operation function of air conditioner. In addition, an operation function of audio device or an operation function of mobile phone or smartphone may be associated. An area N not associated with the functions described above is set in an area not included in any of the areas A, B, C and D.

The correspondence relationship between the areas set on the touch sensor 11 and the operation functions is not limited to those described above. For example, the area N may be associated with a particular function, and the area A may be not associated with any function.

The area demarcation set on the touch sensor 11 is not limited to the example illustrated in FIG. 4. For example, the left half or the upper half of the touch sensor 11 may be set as one area. For another example, an area positioned at an edge between a corner and another corner and not including any corners of the touch sensor 11 may be set as one area. In the example illustrated in FIG. 4, areas are demarcated respectively to include one of the four corners of the touch sensor 11. Note that the area demarcation can be determined as appropriate even if the touch sensor 11 does not include any corners.

When there is a touch on an area demarcated on the touch sensor 11, the controller 10 may present a tactile sensation associated with the area to the finger that is touching. For example, a rough feeling according to the slide of the finger may be presented to the finger touching the area A. On the other hand, a smooth feeling according to the slide of the finger may be presented to the finger touching the area N.

[Transition to Operable State] The vehicular control unit 1 according to the present embodiment is capable of guiding the user's operation and reducing the movement of the user's line of sight while driving by presenting a tactile sensation to the finger of the user who is blind touching. The control method upon accepting an operation may be configured such that erroneous operation is less likely to occur when blind touching the touch sensor 11. The controller 10 is configured to cause the vehicular control unit 1 to transition to a standby state in which the vehicle mounted apparatuses 80 cannot be operated in response to input to the touch sensor 11 as an initial state. It is assumed that in the standby state, a touch operation or a slide operation on the touch sensor 11 cannot be accepted. The controller 10 is configured to cause the vehicular control unit 1 to transition from the standby state to an operable state when pressing equal to or higher than a predetermined pressure is applied to the touch sensor 11. The predetermined pressure, which is the condition for transition from the standby state to the operable state, is also referred to as a first pressure. The operable state can also be said to be a state enabling operation of the vehicle mounted apparatuses 80 in response to input to the touch sensor 11. Since an operation for transition from the standby state to the operable state is required, the likelihood of erroneous operations can be reduced.

Figure 5:
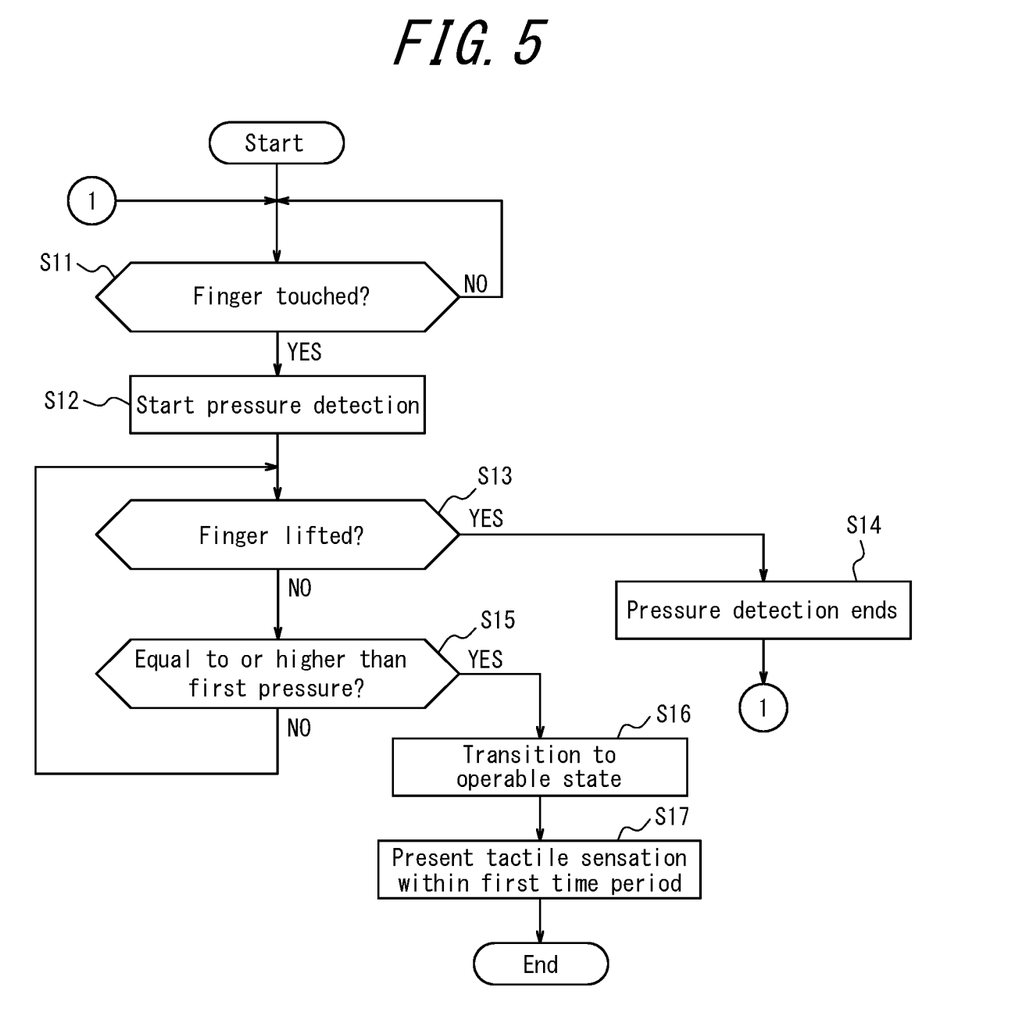
FIG. 5 is a flowchart illustrating an example of a control method of the vehicular control unit.

The controller 10 can cause the vehicular control unit 1 to transition from the standby state to the operable state with the control method illustrated in the flowchart of FIG. 5. Initially, the controller 10 acquires information from the touch sensor 11 and determines whether the finger is touching the touch sensor 11 (Step S11).

If the finger is not touching the touch sensor 11 (Step S11: NO), the controller 10 returns to Step S11. If the finger is touching the touch sensor 11 (Step S11: YES), the controller 10 causes the pressing detector 13 to start pressing detection (Step S12).

Then, the controller 10 acquires information from the touch sensor 11 and determines whether the finger has been lifted from the touch sensor 11 (Step S13).

If the finger has been lifted from the touch sensor 11 (Step S13: YES), the controller 10 causes the pressing detector 13 to end the pressing detection (Step S14). Then, the controller 10 returns to Step S11.

If the finger has not been lifted from the touch sensor 11 (Step S13: NO), the controller 10 acquires information on pressing from the pressing detector 13 and determines whether the pressing is equal to or higher than the first pressure (Step S15).

If the pressing is not equal to or higher than the first pressure (Step S15: NO), the controller 10 returns to Step S13. When the pressing is not equal to or higher than the first pressure, it can also be said that the pressing is less than the first pressure. If the pressing is equal to or higher than the first pressure (Step S15: YES), the controller 10 causes the vehicular control unit 1 to transition to the operable state (Step S16). At this time, the controller 10 may cause the tactile sensation presentation unit 12 to present a tactile sensation such as a click feeling.

The controller 10 causes the tactile sensation presentation unit 12 to present a tactile sensation corresponding to the transition to the operable state within a first time period from the transition to the operable state (Step S17). The first time period may be set to a length of time, for example, 500 msec, during which the user does not release the finger after pressing the touch sensor 11. Various kinds of tactile sensations can be used for the tactile sensation corresponding to the transition to the operable state. Then, the controller 10 ends the processing illustrated in the flowchart of FIG. 5. The first time period may be an appropriate time period so as to indicate that the apparatus reacted to the operation performed by the user. The user may feel uncomfortable if the first time period is too long or too short.

When determining whether the pressing is equal to or higher than the predetermined pressure in Step S15, the position touched by the finger may be anywhere on the touch sensor 11. In this case, the user can easily cause the vehicular control unit 1 to transition to the operable state.

When determining whether the pressing is equal to or higher than the predetermined pressure in Step S15, it may be a condition that the position touched by the finger is included in the predetermined areas. In this case, the possibility that the vehicular control unit 1 transitions to the operable state at the timing unintended by the user can be reduced. The controller 10 may cause the tactile sensation presentation unit 12 to present a tactile sensation indicating a predetermined area. An uneven structure indicating the predetermined areas may be provided on the touch surface 11a of the touch sensor 11.

Figure 6:
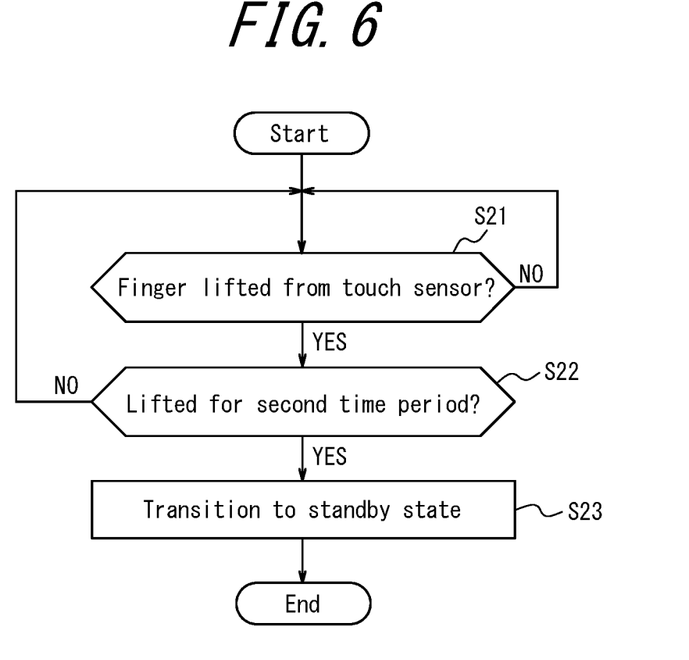
FIG. 6 is a flowchart illustrating an example of a control method of the vehicular control unit.

The controller 10 may cause the vehicular control unit 1 to transition from the operable state to the standby state according to the control method illustrated in the flowchart of FIG. 6.

The controller 10 acquires information from the touch sensor 11 and determines whether the finger has been lifted from the touch sensor 11 (Step S21). The state in which the finger has been lifted from the touch sensor 11 can also be said to be a state in which there is no input to the touch sensor 11. If the finger has not been lifted from the touch sensor 11 (Step S21: NO), the controller 10 continues the operation of Step S21 while keeping the vehicular control unit 1 operable.

If the finger has been lifted from the touch sensor 11 (Step S21: YES), the controller 10 determines whether the finger has been lifted for a second time period or longer (Step S22).

The second time period may be set to the same length as the first time period described in Step S17 of FIG. 5, or a different length.

If the finger has not been lifted from the touch sensor 11 for the second time period or longer (Step S22: NO), the controller 10 deems that the finger has not left the touch sensor 11 and returns to Step S21. A case in which the finger has not left the touch sensor 11 by the second time period or longer corresponds to a case in which the finger touched the touch sensor 11 again within a second time period.

If the finger has been lifted from the touch sensor 11 for the second time period or longer (Step S22: YES), the controller 10 causes the vehicular control unit 1 to transition to the standby state (Step S23). A case in which the finger has been lifted for the second time period or longer correspond to a case in which the finger did not touch again within the second time period. The state in which the finger has been lifted from the touch sensor 11 for the second time period or longer can also be said to be a state in which the second time period or longer has passed since the input ceased. Then, the controller 10 ends the processing illustrated in the flowchart of FIG. 6.

According to the control methods illustrated in the flowcharts of FIGS. 5 and 6, input to the touch sensor 11 that is unintended by the user becomes less likely to occur. When input occurs in a way such as when chattering occurs in the touch sensor 11 or when the user unintentionally releases the finger for a short time, state transition unintended by the user becomes less likely to occur.

[Acceptance of Instruction for Operation Function Execution] In principle, while the vehicular control unit 1 is in the operable state, the user's finger continues to touch the touch sensor 11. The user slides the finger on the touch sensor 11 and moves the finger to an area illustrated in FIG. 4. The user performs an input to an area by pressing the touch sensor 11 in a state touching the area. When an input to an area is performed, the vehicular control unit 1 executes the function associated with the area.

Figure 7:
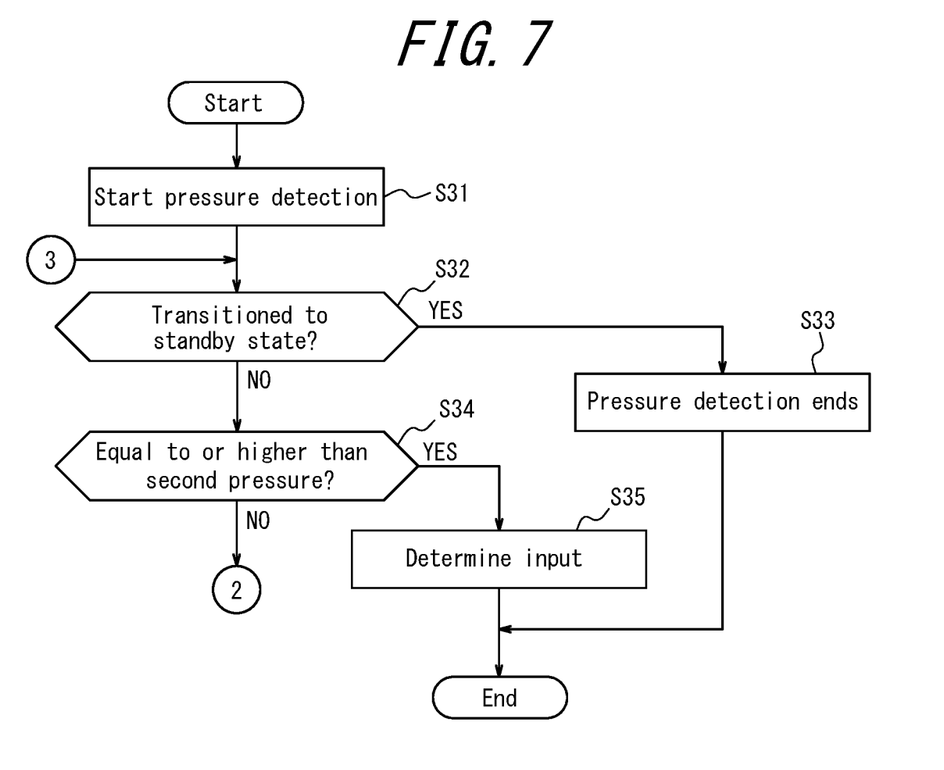
FIG. 7 is a flowchart illustrating an example of a control method of the vehicular control unit.
Figure 8:
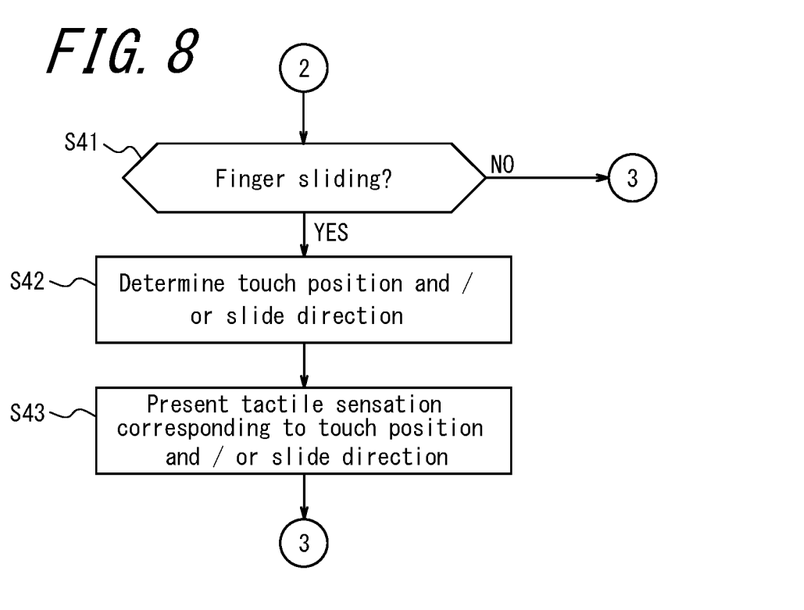
FIG. 8 is a flowchart illustrating an example of a control method of the vehicular control unit.

FIGS. 7 and 8 are flowcharts illustrating control methods related to the operation of the vehicular control unit 1. The controller 10 may control the vehicular control unit 1 with the control methods illustrated in the flowcharts of FIGS. 7 and 8. The control methods illustrated in FIGS. 7 and 8 are to be executed when the vehicular control unit 1 is in the operable state.

Initially, the controller 10 causes the pressing detector 13 to start detection of pressure (Step S31 in FIG. 7). The controller 10 determines whether the vehicular control unit 1 has transitioned to the standby state (Step S32).

If the vehicular control unit 1 has transitioned to the standby state (Step S32: YES), the controller 10 causes the pressing detector 13 to end the detection of pressure (Step S33). Then, the controller 10 ends the processing illustrated in the flowchart of FIG. 7. A case in which the vehicular control unit 1 transitions to the standby state corresponds to a case in which the controller 10 executes the processing of Step 23 in the flowchart of FIG. 6.

If the vehicular control unit 1 has not transitioned to the standby state (Step 32: NO), the controller 10 acquires information on pressing from the pressing detector 13 and determines whether the pressing is equal to or higher than a second pressure (Step S34). The second pressure may be set to the same value as the first pressure which is a determination condition in Step S15 of FIG. 5, or a different value.

If the pressing is not equal to or higher than the second pressure (Step S34: NO), the controller 10 proceeds to Step S41 in the flowchart of FIG. 8. When the pressing is not equal to or higher than the second pressure, it can also be said that the pressing is less than the second pressure. If the pressing is equal to or higher than the second pressure (Step S34: YES), the controller 10 determines the input at the current touch position (Step S35). At this time, the controller 10 may cause the tactile sensation presentation unit 12 to present a tactile sensation such as a click feeling. The operation function execution processing after input determination will be described later. Then, the controller 10 ends the processing illustrated in the flowchart of FIG. 7.

In Step S34, the controller 10 may perform determination based on the condition of whether an operation function is associated with the touch area to which the pressing is applied, and not only the condition of whether the pressing is equal to or higher than the second pressure. With such a configuration, for example, in the case in which no operation function is associated with the area N, when pressing equal to or higher than the second pressure is applied to the area N, the controller 10 can be prevented from proceeding to Step S35.

The controller 10 acquires information from the touch sensor 11 and determines whether the finger touching the touch sensor 11 is sliding (Step S41 of FIG. 8). If the finger is not sliding (Step S41: NO), the controller 10 returns to Step S32 in FIG. 7.

If the finger is sliding (Step S41: YES), the controller 10 determines the touch position and/or the slide direction of the finger based on the information acquired from the touch sensor 11 (Step S42).

Then, the controller 10 causes the tactile sensation presentation unit 12 to present a tactile sensation corresponding to the area including the touch position of the finger and/or the slide direction of the finger (Step S43). The area including the touch position of the finger is also referred to as a touch area.

When presenting a tactile sensation corresponding to the touch area, the tactile sensation presentation unit 12 may, for example, not present a tactile sensation or present a smooth feeling to a finger touching the area N illustrated in FIG. 4. In addition, the tactile sensation presentation unit 12 may present a rough feeling to the finger touching any one of the areas A, B, C and D illustrated in FIG. 4.

When presenting a tactile sensation corresponding to a slide direction of the finger, for example, the tactile sensation presentation unit 12 may present tactile sensation in a pulsed form with a first cycle to a finger sliding on the touch sensor 11 in a direction from the center towards an edge. In addition, the tactile sensation presentation unit 12 may present tactile sensation in a pulsed form with a second cycle that is different from the first cycle to a finger sliding on the touch sensor 11 in a direction from an edge towards the center. A tactile sensation presented in a pulsed form with cycle T is also referred to as a tactile sensation group with cycle T.

The tactile sensation presentation unit 12 may present tactile sensation groups with different cycles for cases in which the slide direction of the finger is a direction leaving the touch area and cases in which the slide direction of the finger is a direction entering the touch area.

For example, in a case in which the area A in FIG. 4 is the touch area, the direction leaving the touch area is assumed to be a direction from any position included in the area A to the area N, namely, a direction towards the lower right. A slide in a direction leaving the touch area is also referred to as a first slide.

For example, in the case in which the area A in FIG. 4 is the touch area, the direction entering the touch area is assumed to be a direction from any position included in the area A to an edge or a corner of the touch surface 11a, namely, a direction towards the upper left. Hereinafter, a slide in a direction of entering the touch area is also referred to as a second slide.

In another example, in the case in which the area N in FIG. 4 is the touch area, the direction leaving the touch area can be said to be a direction away from the center of the area N, and the direction entering the touch area can be said to be a direction towards the center of the area N.

By presenting tactile sensation corresponding to the slide direction as described above, for example, the user can know which of the areas A, B, C and D is the finger heading for without viewing the touch sensor 11.

In the case in which the slide direction of the finger is entering the touch area, the tactile sensation presentation unit 12 may change the vibration pattern of the tactile sensation presentation according to the distance between the touch position of the finger and the edge or the corner of the touch sensor 11. For example, the tactile sensation presentation unit 12 may lengthen or shorten the cycle of the tactile sensation group, as the touch position of the finger approaches the edge or the corner of the touch sensor 11. In addition, the tactile sensation presentation unit 12 may strengthen or weaken the intensity of the tactile sensation, as the touch position of the finger approaches the edge or the corner of the touch sensor 11. Further, the tactile sensation presentation unit 12 may increase or decrease the frequency of the vibration that presents the tactile sensation, as the touch position of the finger approaches the edge or the corner of the touch sensor 11. By changing the tactile sensation according to the touch position of the finger as described above, the user can know the distance between the touch position of the finger and the edge or the corner of the touch sensor 11.

As an example of a method of changing tactile sensation, the tactile sensation presentation unit 12 may weaken the intensity of the tactile sensation, shorten the cycle of the tactile sensation group, and decrease the frequency of vibration that presents tactile sensation, as the center of the area N is approached. On the other hand, the tactile sensation presentation unit 12 may strengthen the intensity of the tactile sensation, lengthen the cycle of the tactile sensation group, and increase the frequency of the vibration that presents tactile sensation, as the corner of the touch sensor 11 that includes the area A is approached. By presenting contrasting tactile sensation depending on whether the finger is near the center or the corner as described above, the user can sense the touch position more clearly.

When the finger slides across areas, the tactile sensation presentation unit 12 may present an uneven feeling at a position corresponding to the boundary of an area. When the finger slides across areas, it corresponds to the case in which the touch area switches. In this manner, the user can sense that the touch area has switched.

In Step S43 of FIG. 8, the tactile sensation patterns presented by the tactile sensation presentation unit 12 are not limited to the above described examples. After executing Step S43 in FIG. 8, the controller 10 returns to Step S32 in FIG. 7.

According to the control methods illustrated in FIGS. 7 and 8, the user can slide the finger towards an area associated with a function of the vehicular control unit 1 without viewing the touch sensor 11.

[Operation Function Execution Processing] In Step S35 of FIG. 7, when an input to the touch sensor 11 is determined, the controller 10 executes the operation function associated with the touch area in which the input is determined. For example, in the case of an input to the area A associated with an operation function of car navigation system, the controller 10 updates the area demarcation of the touch sensor 11 to a navigation operation menu.

When the area demarcation of the touch sensor 11 is updated to the operation menu of the car navigation system, the controller 10 executes the processing in the flowchart of FIG. 7 and accepts input to the touch sensor 11. For example, when an input to an area associated with an operation function of map enlargement is determined, the controller 10 executes enlargement of the map.

According to the execution result of the operation function associated with the area in which the input is determined, the controller 10 causes the tactile sensation presentation unit 12 to present a predetermined tactile sensation. For example, when the operation function cannot be executed for a reason such as the map cannot be enlarged any more, the tactile sensation presentation unit 12 may generate a low frequency vibration twice in a short time and present a "bubu" tactile sensation. The interval at which the low frequency vibration is generated twice may be, for example, 50 msec. The tactile sensation "bubu" expresses how the user feels using onomatopoeia. The driving signal for actually presenting the tactile sensation is as exemplified.

When execution of the inputted operation function is completed, the tactile sensation presentation unit 12 may present a monotonous tactile sensation by generating a sinusoidal vibration of a single frequency for a short time. The time period during which the sinusoidal vibration continues may be, for example 50 msec. According to the execution result of the operation function, the tactile sensation presentation unit 12 may generate a Doppler curve vibration to present a tactile sensation. Vibrations that can be generated for tactile sensation presentation are not limited to the above described vibrations.

Tactile sensation according to the execution result of an operation function as described above may be presented after the user presses with the finger to determine an input, and within the time until the finger is released. The time period from the determination of an input to the presentation of a tactile sensation may be, for example, 500 msec. In this manner, the execution result of an operation function can be notified to the user using tactile sensation only.

The vehicular control unit 1 according to the present embodiment can be operated by blind touch by presenting tactile sensations to the finger touching the touch sensor 11. As a result, the driving of the vehicle can be performed safely. The vehicular control unit 1 according to the present embodiment is configured to transition to the operable state by means of a predetermined operation. As a result, erroneous operations caused by touching the touch sensor 11 at a timing not intended by the user can be reduced.

The control methods of the vehicular control unit 1 described with reference to FIGS. 5 to 8 may be executed in parallel.

Figure 9:
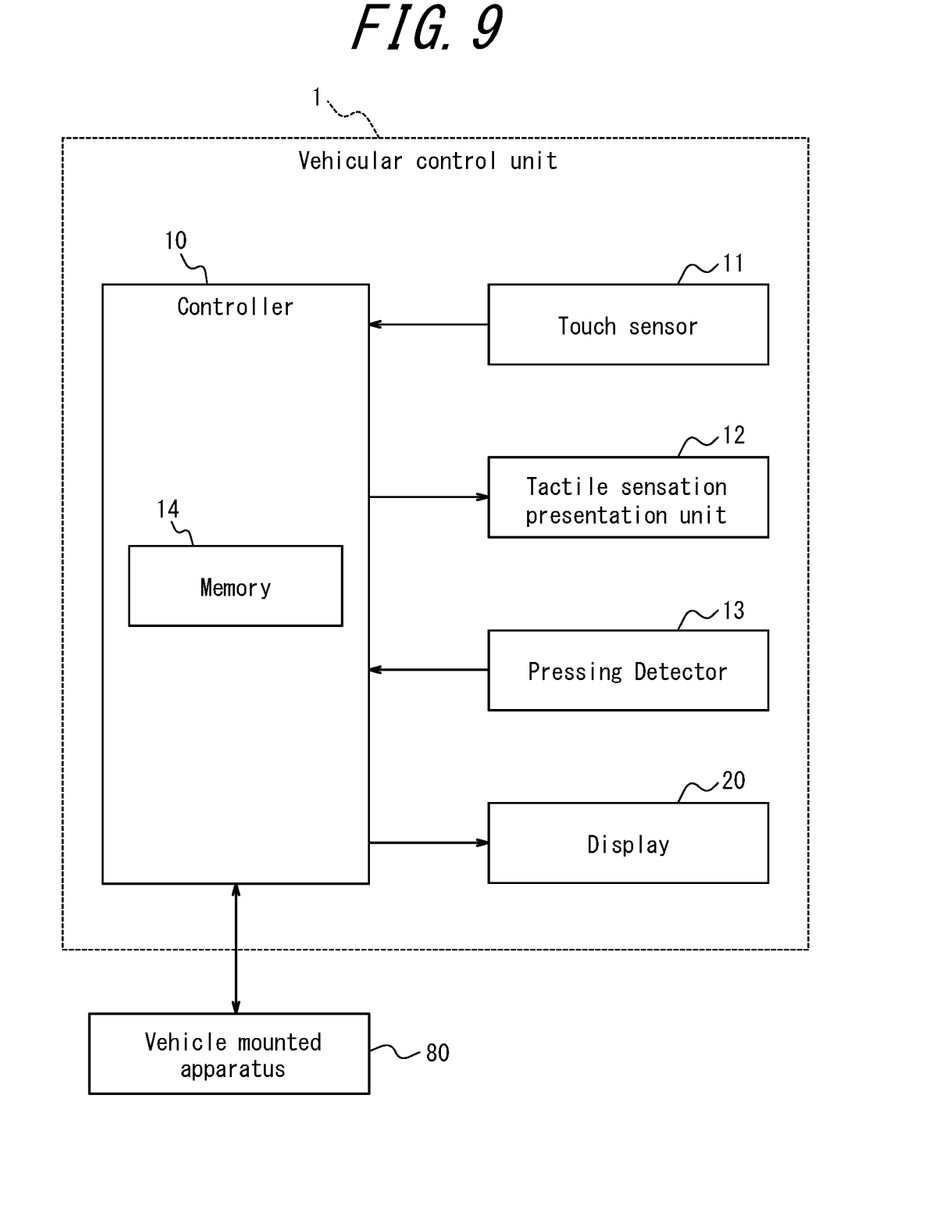
FIG. 9 is a functional block diagram illustrating the schematic configuration of a vehicular control unit according to Embodiment 2.

(Embodiment 2) Compared with the functional block diagram illustrated in FIG. 1, the vehicular control unit 1 according to Embodiment 2 illustrated in FIG. 9 further includes a display 20. The controller 10 is configured to output information for displaying characters, images or the like to the display 20. The description of the other components such as the touch sensor 11 is similar to those in FIG. 1 and is therefore omitted.

The display 20 is configured to display characters, images or the like that can be visually recognized by the user, based on information acquired from the controller 10.

The display 20 may be a head-up display. A head-up display is also referred to as a HUD. A HUD is configured to project an image on the front wind shield of a vehicle, and cause the user to visually recognize reflected light of the projected image as a virtual image. The display 20 may be a liquid crystal display, an organic or inorganic EL (Electro-Luminescence) display, or the like. A liquid crystal display is also referred to as a LCD. The display 20 may be provided on the upper part of the center console of the vehicle such that, as far as possible, the user does not need to move the line of sight from the forward direction while driving the vehicle. Note that the display 20 is not limited to the above configuration.

Figure 10:
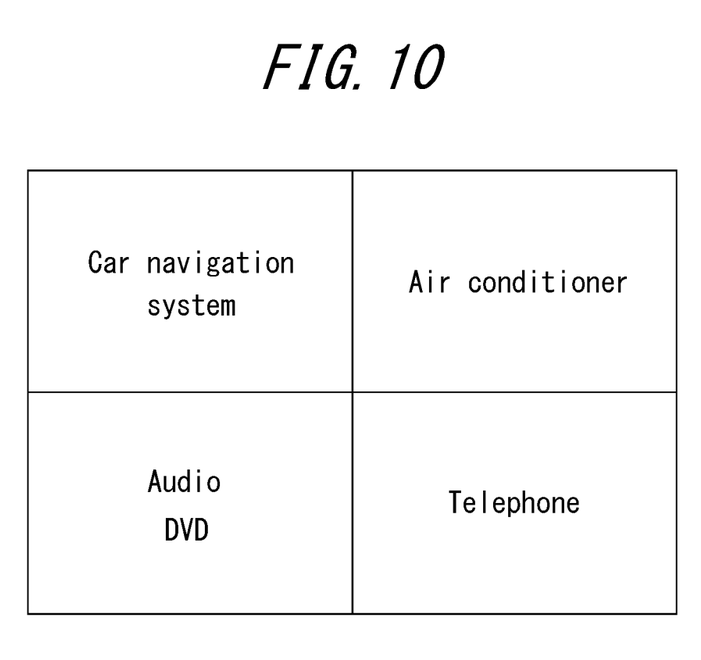
FIG. 10 is an example in which operation functions are displayed on a display according to Embodiment 2.

When the vehicular control unit 1 is in the standby state, the controller 10 may cause the display 20 to display information to notify the user that transition to the operable state can be realized by pressing the touch sensor 11. When the vehicular control unit 1 is in the operable state, the controller 10 may cause the display 20 to display the correspondence relationship between the areas set on the touch sensor 11 illustrated in FIG. 4 and the operation functions. Comparing the examples of operation function displayed on the display 20 illustrated in FIG. 10 and the examples of area set on the touch sensor 11 illustrated in FIG. 4, it can be known that the area A in FIG. 4 is associated with the operation function of the car navigation system. In addition, the areas B, C and D are respectively associated with the operation functions of the air conditioner, the audio/DVD and the telephone. By confirming the display 20, the user can know the correspondence relationship between the areas provided on the touch sensor 11 and the operation functions.

Provided with the display 20 in this manner, the user can confirm which of the areas on the touch sensor 11 corresponds to the desired function to be executed by the vehicular control unit 1 without diverting the line of sight significantly from the front of the vehicle. As a result, the driving of the vehicle can be performed safely.

(Variation) In the control method illustrated in the flowchart of FIG. 6, the controller 10 causes the vehicular control unit 1 to transition from the operable state to the standby state when the finger has been lifted from the touch sensor 11 for a predetermined time period or longer. As a variation, the controller 10 may change the time period from when the finger is lifted from the touch sensor 11 to the transition of the vehicular control unit 1 to the standby state.

Figure 11:
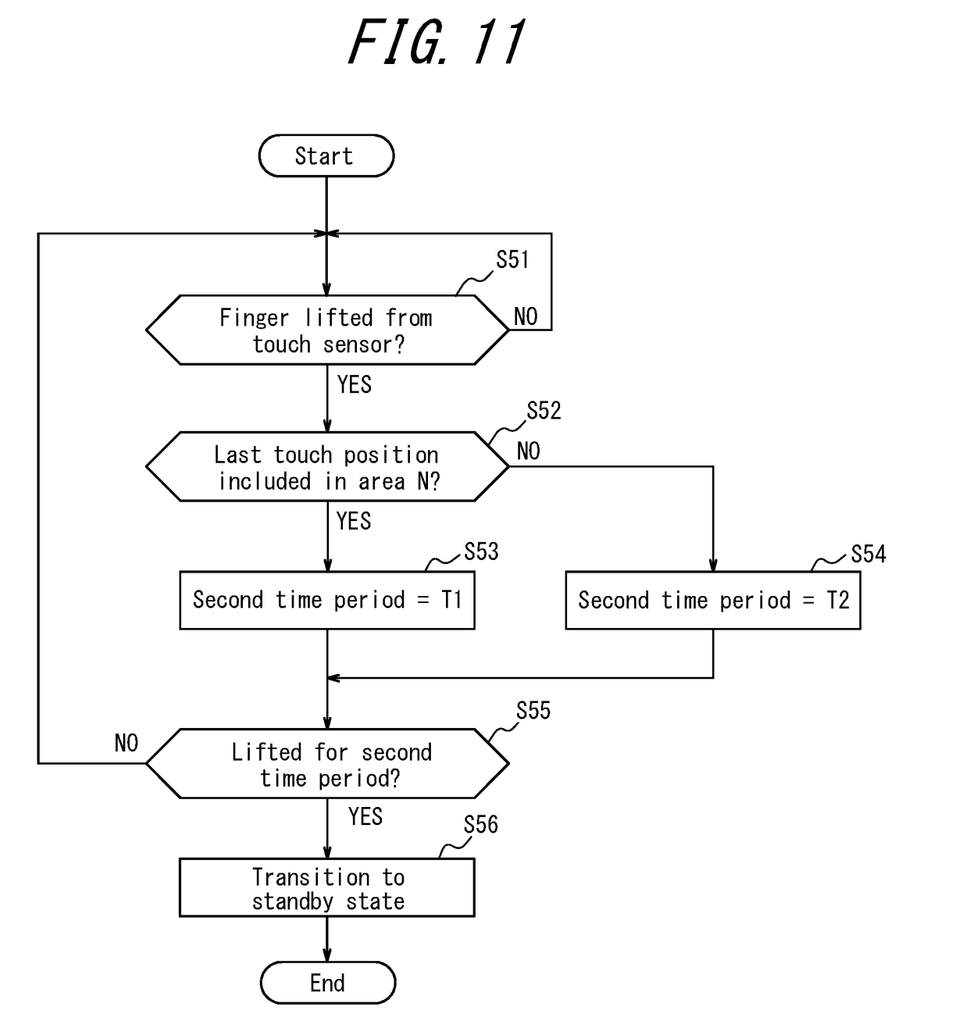
FIG. 11 is a flowchart illustrating a control method according to a variation.

The controller 10 may control the vehicular control unit 1 with the control method illustrated in the flowchart of FIG. 11. Initially, the controller 10 acquires information from the touch sensor 11 and determines whether the finger has been lifted from the touch sensor 11 (Step S51). The state in which the finger has been lifted from the touch sensor 11 corresponds to a state in which there is no input to the touch sensor 11. If the finger has not been lifted from the touch sensor 11 (Step S51: NO), the controller 10 continues the operation of SM while keeping the vehicular control unit 1 operable.

On the other hand, if the finger has been lifted from the touch sensor 11 (Step S51: YES), the controller 10 determines whether the position touched by the finger immediately before the finger was lifted (hereinafter, also referred to as "last touch position") is included in the area N (Step S52). If the last touch position is included in the area N (Step S52: YES), the controller 10 sets the second time period which is used as the condition of the determination step of Step S55 to T1 (Step S53) and proceeds to Step S55. If the last touch position is not included in the area N (Step S52:

NO), the controller 10 sets the second time period to T2 (Step S54) and proceeds to Step S55.

Then, the controller 10 determines whether the finger has been lifted for a second time period or longer (Step S55). The second time period may be either T1 set in Step S53 or T2 set in Step S54. If the finger has not been lifted for the second time period or longer (Step S55: NO), the controller 10 deems that the finger has not left the touch sensor 11 and returns to Step SM. When the finger has not been lifted for the second time period or longer, it corresponds to the case in which the finger touched again within the second time period.

If the finger has been lifted for the second time period or longer (Step S55: YES), the controller 10 causes the vehicular control unit 1 to transition to the standby state (Step S56). Then, the controller 10 ends the processing illustrated in the flowchart of FIG. 11.

T1 and T2 can be set according to various variations. For example, when the touch position is included in the area N with which no operation function is associated, it is still unclear whether the user intends to cause the vehicular control unit 1 to execute any operation function. That is, this case is before the user takes any specific action. Thus, in order to avoid unconscious operation, T1 set as the second time period can be a short time period.

For example, when the touch position is included in the areas A to D with which an operation function is respectively associated, there is a possibility that the user desires to cause the vehicular control unit 1 to execute an operation function. That is, in this case, there is a high possibility that the user is taking a specific action. Thus, in consideration of operational convenience, T2 set as the second time period can be a time period longer than T1.

Although embodiments according to the present disclosure have been described based on the accompanying drawings and examples, it is to be noted that various changes and modifications will be apparent to those skilled in the art based on this disclosure. Thus, such changes and modifications are to be understood as included within the scope of this disclosure. For example, functions and the like included in various components and steps may be reordered in any logically consistent way. Furthermore, components or steps may be combined into one or divided. Although embodiments according to the present disclosure have been described centering on an apparatus, it is to be noted that embodiments according to the present disclosure may be realized as a method including steps respectively executed by each component of an apparatus. Further, although embodiments according to the present disclosure have been described centering on an apparatus, it is to be noted that embodiments according to the present disclosure may be realized as a method executed by a processor included in an apparatus, or as a program or a storage medium recording a program. It is to be understood that these are also included within the scope of the present disclosure.

The invention claimed is:

1. A vehicular control unit, comprising:
a touch sensor on which a predetermined area is set;
a vibration generator for presenting a tactile sensation to a user via the touch sensor;
a pressing detector for detecting pressing against the touch sensor; and
a controller that enables operation of a vehicle mounted apparatus in response to an input to the touch sensor when the pressing is equal to or higher than a first pressure; wherein the controller is configured to
when the operation of the vehicle mounted apparatus is enabled, within a first time period, cause the vibration generator to present a tactile sensation corresponding to enablement of the operation of the vehicle mounted apparatus;
in the case of a first slide within the predetermined area in a direction going out of the predetermined area, cause the vibration generator to present a tactile sensation corresponding to the first slide; and
in the case of a second slide within the predetermined area in a direction going into the predetermined area, cause the vibration generator to present a tactile sensation corresponding to the second slide.

2. The vehicular control unit according to claim 1, wherein
the touch sensor has a plurality of corners;
the predetermined area is provided so as to include at least one of the corners; and
the controller is configured to, when pressing against the predetermined area is equal to or higher than a second pressure, execute an operation function associated with the predetermined area.

3. The vehicular control unit according to claim 2, wherein
the controller is configured to prevent operation of the vehicle mounted apparatus in response to an input to the touch sensor, when a state in which there is no input to the touch sensor continues for a second time period after the operation of the vehicle mounted apparatus is enabled.

4. The vehicular control unit according to claim 3, wherein
the second time period is set to be a longer time period when a position at which an input is made immediately before input to the touch sensor ceases is included in the predetermined area, than when the position is not included in the predetermined area.

5. The vehicular control unit according to claim 4, further comprising
a display for displaying an operation function associated with the predetermined area.

6. The vehicular control unit according to claim 3, further comprising
a display for displaying an operation function associated with the predetermined area.

7. The vehicular control unit according to claim 2, further comprising
a display for displaying an operation function associated with the predetermined area.

8. The vehicular control unit according to claim 1, wherein
the controller is configured to prevent operation of the vehicle mounted apparatus in response to an input to the touch sensor, when a state in which there is no input to the touch sensor continues for a second time period after the operation of the vehicle mounted apparatus is enabled.

9. The vehicular control unit according to claim 8, wherein
the second time period is set to be a longer time period when a position at which an input is made immediately before input to the touch sensor ceases is included in the predetermined area, than when the position is not included in the predetermined area.

10. The vehicular control unit according to claim 9, further comprising a display for displaying an operation function associated with the predetermined area.

11. The vehicular control unit according to claim 8, further comprising
a display for displaying an operation function associated with the predetermined area.

12. The vehicular control unit according to claim 1, further comprising
a display for displaying an operation function associated with the predetermined area.

13. A control method of a vehicular control unit, the vehicular control unit comprising a touch sensor on which a predetermined area is set, a vibration generator for presenting a tactile sensation to a user via the touch sensor, a pressing detector for detecting pressing against the touch sensor, and a controller that enables operation of a vehicle mounted apparatus in response to an input to the touch sensor, comprising:
when the pressing is equal to or higher than a first pressure, enabling the operation of the vehicle mounted apparatus in response to an input to the touch sensor;
when the operation of the vehicle mounted apparatus is enabled, within a first time period, causing the vibration generator to present a tactile sensation corresponding to enablement of the operation of the vehicle mounted apparatus;
in the case of a first slide within the predetermined area in a direction going out of the predetermined area, causing the vibration generator to present a tactile sensation corresponding to the first slide; and
in the case of a second slide within the predetermined area in a direction going into the predetermined area, causing the vibration generator to present a tactile sensation corresponding to the second slide.

14. The control method of the vehicular control unit according to claim 13, further comprising
when pressing against the predetermined area is equal to or higher than a second pressure, executing an operation function associated with the predetermined area, wherein
the touch sensor has a plurality of corners; and
the predetermined area is provided so as to include at least one of the corners.

15. The control method of the vehicular control unit according to claim 14, further comprising:
preventing operation of the vehicle mounted apparatus in response to an input to the touch sensor, when a state in which there is no input to the touch sensor continues for a second time period after the operation of the vehicle mounted apparatus is enabled.

16. The control method of the vehicular control unit according to claim 15, wherein
the second time period is set to be a longer time period when a position at which an input is made immediately before input to the touch sensor ceases is included in the predetermined area, than when the position is not included in the predetermined area.

17. The control method of the vehicular control unit according to claim 14, wherein
the vehicular control unit further comprises a display for displaying an operation function associated with the predetermined area.

18. The control method of the vehicular control unit according to claim 13, further comprising:
preventing operation of the vehicle mounted apparatus in response to an input to the touch sensor, when a state in which there is no input to the touch sensor continues for a second time period after the operation of the vehicle mounted apparatus is enabled.

19. The control method of the vehicular control unit according to claim 18, wherein
the second time period is set to be a longer time period when a position at which an input is made immediately before input to the touch sensor ceases is included in the predetermined area, than when the position is not included in the predetermined area.

20. The control method of the vehicular control unit according to claim 13, wherein
the vehicular control unit further comprises a display for displaying an operation function associated with the predetermined area.

* * * * *